March 25, 1930.    F. W. STEERE    1,752,036
WATER GAS MANUFACTURE
Filed Dec. 22, 1924
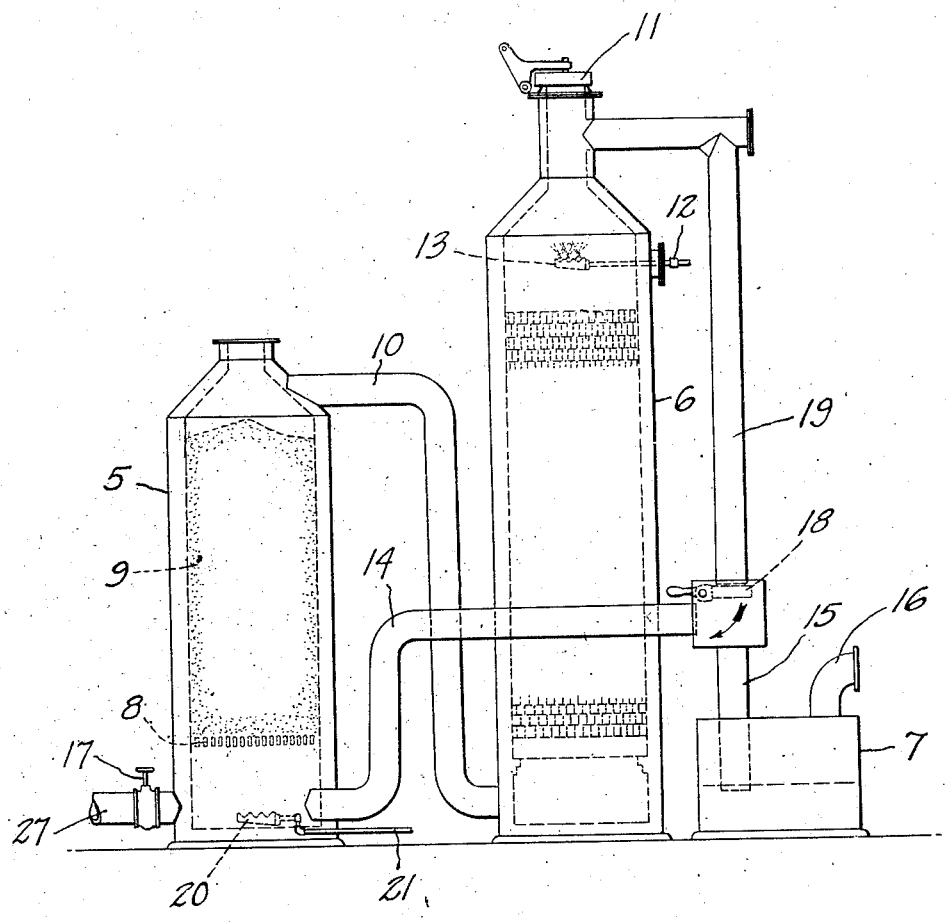
INVENTOR
FRANK W. STEERE
BY
Jhing Harness
ATTORNEY Patented Mar. 25, 1930

1,752,036

UNITED STATES PATENT OFFICE

FRANK W. STEERE, OF HIGHLAND PARK, MICHIGAN, ASSIGNOR, BY MESNE ASSIGNMENTS, TO SEMET-SOLVAY ENGINEERING CORPORATION, OF NEW YORK, N. Y., A CORPORATION OF NEW YORK

WATER-GAS MANUFACTURE

Application filed December 22, 1924. Serial No. 757,399.

In recent years, it has become quite customary in the manufacture of carburetted water gas to alternate "up runs" with "back runs" in the gas plant. In making "up runs" steam is introduced in the bottom of the generator and is passed through the generator, the resultant gas being passed into and through the carburetor, into the superheater and then into the wash-box of the gas plant, while in making "back-runs", steam is introduced in the superheater, passed through the generator, the resultant gas being passed into the wash-box.

In my co-pending application, Serial No. 739,289, filed September 23rd, 1924, I have disclosed a means for introducing water in the superheater in order to utilize the heat contained in the superheater for generating steam for use in "back runs".

It is an object of the present invention to provide a gas plant wherein no steam generated by outside sources need be used.

This invention comprises a process of making water gas in a two-shell set including a generator, a superheater and wash box connected in series and having a connection from the base of the generator to the wash box, which comprises blasting a fuel bed in the generator and passing the resultant blast gases through the superheater to heat said superheater and thereafter passing steam into and through said superheater into the fuel bed in the generator and leading the resultant gas make from approximately the base of the generator to the wash-box.

With the above and other objects in view, my invention consists in the arrangement, combination and construction of the various parts of my improved device, as described in the specification, claimed in my claims and shown in the accompanying drawing, in which:

The single figure is a vertical elevation of a gas plant wherein my improved process is carried out, certain of the interior portions of the plant being shown in dotted lines.

I have shown a water gas plant consisting of a water gas generator 5, a superheater 6, and a wash-box 7 containing liquid through which the gas passes as hereinafter described. The customary blast of a free oxygen containing gas, of which air and oxygen are examples, may be introduced in the bottom of the generator through the opening 27, passing upwardly through the grates 8 and the fuel 9, the resultant blast gases being led through the passage 10 into the superheater 6 and out through the conventional stack cap 11, when the cap is open.

Water may be introduced in the top of the superheater 6 from a suitable source of supply through the passage 12 and the spray device 13, said spray device being so constructed as to introduce a finely comminuted spray or fog of water. The water will almost immediately be generated into steam which will pass down through the superheater, into and through the passage 10, into the generator 5 down through the fuel bed therein, thereby generating water gas which is led from substantially the base of the generator, through the passage 14 and the passage 15 into the wash-box 7, and from there through the passage 16 into a suitable gas holder. It will be noted that a valve 17 is provided in the blasting line 27 so that such line may be disconnected when effecting a gas-making run. It will also be noted that a pivoted valve 18 is provided, which is adapted to close the bottom of the passage 19 leading from the top of the superheater when a steam back run is being made.

To maintain substantially uniform fuel bed conditions and to obtain maximum gas making capacity from the set it is desirable to effect an "up run" at predetermined intervals and for this purpose I have shown a spray 20 in the bottom of the generator which may be connected with a suitable source of water supply through the connection 21. Water introduced at this point will be converted into steam, will pass up through the fuel bed in the generator 5, the resultant gas being passed through the passage 10, into and through the superheater 6, out through the passages 19 and 15, into the wash-box 7 and thence into a suitable holder through the passage 16. In effecting this run, the valve 18 will be moved to close the opening from the passage 14 to the wash-box 7 and consequently the opening between the passages 15 and 19 maintained free for the passage of gas.

It will thus be noted that in a construction of the class described, the use of steam generated outside of the gas plant is entirely avoided and a consequent saving in equipment and operation effected.

It will also be noted that during the back-run, steam passes from the superheater into the generator and down through the fuel bed therein, the resultant water gas passing from the lower portion of the fuel bed, through the grate supporting the fuel bed and is withdrawn directly from substantially the base portion of the generator. The gas in passing through the lower portion of the fuel bed and grate comes into heat regenerative relation therewith whereby the gas make is cooled, and the temperature of the lower portion of the fuel bed, the grate and the surrounding structure is raised. If the back-run is followed by an uprun the heat imparted to the lower portion of the fuel bed is in part used to generate steam from water introduced to the base portion of the generator and is absorbed by the steam passing therethrough thereby superheating this steam. If a blast period follows the backrun the heat imparted to the lower portion of the fuel bed and the grate is absorbed by the air or other blast gas. In either case the heat imparted to the lower portion of the fuel bed, grate and surrounding structure which would otherwise be wasted is, in accordance with this invention, utilized for the manufacture of gas.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. The process of manufacturing water gas in a two-shell set comprising a water gas generator having a bed of fuel therein and a superheater, the individual units being located in separate and detached shells, a washbox connected to the superheater and a conduit leading from substantially the base of the generator to the washbox, which involves passing a free oxygen-containing gas through the fuel bed in the generator, passing the resultant blast gases from the generator into and through the superheater; introducing steam into the base of the fuel bed and passing the water gas thus formed from the generator into substantially the base of the superheater, through the superheater into the washbox, and passing steam down through the superheater and from substantially the base of the superheater directly into substantially the top of the generator and down through the fuel bed therein, thereby generating water gas, and passing said water gas through the lower portion of said fuel bed into and through said conduit and into said washbox.

2. A process for the manufacture of water gas in a two shell set comprising a water gas generator, a superheater, individual units being located in separate, detached shells, and a wash-box, which involves blasting a bed of fuel in the generator with a free oxygen-containing gas and passing the resultant blast gases into and through the superheater to heat the superheater; introducing water into the heated superheater whereby it is converted into steam, passing the steam from the superheater directly into the top of the generator above the fuel bed, down through said fuel bed thereby generating water gas and passing said water gas directly from substantially the base of said generator to the washbox; discontinuing the aforesaid water gas making operation and thereafter introducing water into the base of the generator whereby it is converted into steam, passing said steam up through the fuel bed in the generator thereby generating water gas, passing said gas into and through the superheater and then directly into said wash-box.

FRANK W. STEERE.